US008795612B2

(12) United States Patent
Dixon et al.

(10) Patent No.: US 8,795,612 B2
(45) Date of Patent: Aug. 5, 2014

(54) LEACHING PROCESS FOR COPPER CONCENTRATES CONTAINING CHALCOPYRITE

(75) Inventors: David G. Dixon, Delta (CA); Ghazaleh T. Nazari, Vancouver (CA)

(73) Assignee: The University of British Columbia, Vancouver, British Columbia (CA)

( * ) Notice: Subject to any disclaimer, the term of this patent is extended or adjusted under 35 U.S.C. 154(b) by 37 days.

(21) Appl. No.: 13/805,388

(22) PCT Filed: Jun. 28, 2011

(86) PCT No.: PCT/CA2011/000757
§ 371 (c)(1),
(2), (4) Date: Feb. 26, 2013

(87) PCT Pub. No.: WO2012/000090
PCT Pub. Date: Jan. 5, 2012

(65) Prior Publication Data
US 2013/0209335 A1    Aug. 15, 2013

Related U.S. Application Data

(60) Provisional application No. 61/361,299, filed on Jul. 2, 2010.

(51) Int. Cl.
*C25C 1/00*           (2006.01)
(52) U.S. Cl.
USPC ............................................... 423/27; 423/41
(58) Field of Classification Search
None
See application file for complete search history.

(56) References Cited

U.S. PATENT DOCUMENTS

| 3,856,913 | A | * | 12/1974 | McElroy et al. | 75/730 |
| 3,886,257 | A | * | 5/1975 | Snell | 423/27 |
| 4,571,387 | A | | 2/1986 | Bruynesteyn et al. | |
| 2005/0269208 | A1 | | 12/2005 | Dixon et al. | |
| 2010/0313713 | A1 | * | 12/2010 | Kuwazawa et al. | 75/743 |

FOREIGN PATENT DOCUMENTS

WO    9839491  A1    11/1998

OTHER PUBLICATIONS

Nazari, G., et al., Enhancing the kinetics of chalcopyrite leaching in the Galvanox™ process. Hydrometallurgy, 105(3-4), Jan. 2011, pp. 251-258.
Yuehua, H., et al., The effect of silver-bearing catalysts on bioleaching of chalcopyrite. Hydrometallurgy, 64(2), May 2002, pp. 81-88. Abstract, p. 86-887.
International Search Report mailed on Sep. 27, 2011, for PCT Patent Application No. PCT/CA2011/000757, filed on Jun. 28, 2011, 2 pages.

(Continued)

*Primary Examiner* — Steven Bos
(74) *Attorney, Agent, or Firm* — Kilpatrick Townsend & Stockton LLP

(57) ABSTRACT

A method of recovering copper from chalcopyrite concentrate by chemical leaching, using pyrite and silver. The catalytic properties of pyrite in the chalcopyrite leaching process are significantly enhanced by pretreating the pyrite with silver ions. Particulate pyrite is exposed to a solution containing silver ions to form silver-treated pyrite. Particulate chalcopyrite and the silver-treated pyrite are mixed in an acidic sulfate leach solution. The copper is leached from the concentrate in the leach solution in the presence of an oxygen-containing gas, under conditions whereby the pyrite is substantially unoxidized. The leached copper is recovered from the solution by conventional methods. The used silver-treated pyrite is recycled to the leaching process.

23 Claims, 8 Drawing Sheets

(56) References Cited

OTHER PUBLICATIONS

Romero R. et al., Copper recovery from Chalcopyrite concentrates by BRISA process, 2003, *Hydrometallurgy* 70, 205-215.

Romero R. et al., Silver catalyzed IBES process: application to a Spanish copper—zinc sulfide concentrate, Part 3. Selection of the operational parameters for a continuous pilot plant, 1998, *Hydrometallurgy* 49, 75-86.

Carranza et al., Silver catalyzed IBES process: application to a Spanish copper—zinc sulphide concentrate, 1997, *Hydrometallurgy* 44, 29-42.

* cited by examiner

LEACHING PROCESS FOR COPPER CONCENTRATES CONTAINING CHALCOPYRITE

This application is a U.S. National Phase entry under 35 USC 371 of PCT Application No. PCT/CA2011/000757, filed Jun. 28, 2011, which claims the benefit under 35 USC 119(e) of Provisional Application No. 61/361,299, filed Jul. 2, 2010, the disclosures of which are incorporated by reference herein.

TECHNICAL FIELD OF THE INVENTION

The invention pertains to hydrometallurgical methods for leaching copper from concentrates containing chalcopyrite ($CuFeS_2$).

BACKGROUND OF THE INVENTION

It is known in the copper leaching art that pyrite ($FeS_2$) may be used as a catalyst in the chemical leaching of copper from chalcopyrite concentrates in an acidic sulfate leach solution. Dixon et al., US 2005/0269208 A1, published Dec. 8, 2005, discloses a process for leaching copper from chalcopyrite concentrates using pyrite as a catalyst for ferric reduction in order to eliminate passivation of the chalcopyrite surface. The process is carried out under conditions whereby pyrite is not materially oxidized.

Pyrite from different sources may catalyze the rate of chalcopyrite leaching differently, some pyrites accelerating the rate more than others. It would be desirable to be able to accelerate the rate of leaching to a high degree irrespective of the source and properties of the pyrite used as a catalyst.

SUMMARY OF THE INVENTION

The present inventors have discovered that the catalytic properties of pyrite in a chalcopyrite leaching process are significantly enhanced by pretreating the pyrite with silver ions prior to carrying out the leaching. The pre-treatment may be done by soaking ground pyrite in a solution of a soluble silver salt, such as silver nitrate, before introducing the pyrite into the leaching reactor.

It is known in the prior art that silver catalyzes copper dissolution from chalcopyrite in both chemical and biological leaching. Examples include F. Carranza, I. Palencia and R. Romero (1997) "Silver catalyzed IBES process: application to a Spanish copper-zinc sulfide concentrate," *Hydrometallurgy* 44, 29-42; R. Romero, A. Mazuelos, I. Palencia and F. Carranza (2003), "Copper recovery from chalcopyrite concentrates by BRISA process," *Hydrometallurgy* 70, 205-215; R. Romero, I. Palencia and F. Carranza (1998), "Silver catalyzed IBES process: application to a Spanish copper-zinc sulfide concentrate. Part 3. Selection of the operational parameters for a continuous pilot plant," *Hydrometallurgy* 49, 75-86. However, prior to the present invention, no commercial process has been developed which uses silver successfully as a catalyst to recover copper from chalcopyrite. A fundamental problem is that the leaching reaction conditions limit the availability of silver ion in the leach solution. The catalytic effect of silver is increased by increasing the ferric concentration in the leaching solution; however, higher ferric concentrations favour the precipitation of argentojarosite:

$$3Fe_2(SO_4)_3 + Ag_2SO_4 + 12H_2O \rightarrow 2AgFe_3(SO_4)_2(OH)_6 + 6H_2SO_4$$

This reaction limits the availability of silver ion in solution which may act as a catalyst. Furthermore, once formed, it is difficult and expensive to re-dissolve this precipitate in order to recover the contained silver. Hence, any argentojarosite which forms during the leaching process typically represents an irreversible loss of silver from the process.

Silver which does not form argentojarosite typically reports to the leach residue as silver sulfide (e.g., acanthite, $Ag_2S$) intimately associated with elemental sulfur. This silver can generally be recovered, but at the expense of several additional and inconvenient process steps, including melting sulfur with steam and filtering at 140° C., leaching the desulfurized residue in hot hydrochloric/sulfuric acid solution, and cementing metallic silver on copper powder.

Nor has silver been used successfully as a catalyst for leaching copper in biological leaching systems. The solubility of silver is low in bioleaching solutions due to the bioaccumulation of silver ions within the cell membranes of microorganisms. Furthermore, silver ions are generally toxic to microorganisms, such that bacterial growth is strongly inhibited in the presence of even minor amounts of silver.

The present invention provides a method of recovering copper from chalcopyrite concentrate by chemical leaching, using pyrite and silver. Particulate pyrite is exposed to a solution containing silver ions to form silver-treated pyrite. Particulate chalcopyrite and the silver-treated pyrite are mixed in an acidic sulfate leach solution. The copper is leached from the concentrate in the leach solution, under agitation and in the presence of an oxygen-containing gas, under conditions whereby the pyrite is substantially unoxidized, to produce a solution containing copper ions.

Once the copper is leached from the concentrate, it can be recovered by conventional methods, such as solid-liquid separation, solvent extraction (SX) and electrowinning (EW).

The used silver-treated pyrite may be separated from the leach solution once the leaching reaction is finished and recycled for use in the leaching process.

These and other features of the invention will be apparent from the following description and drawings of the preferred embodiments.

DETAILED DESCRIPTION OF THE PREFERRED EMBODIMENTS

Figure 1:
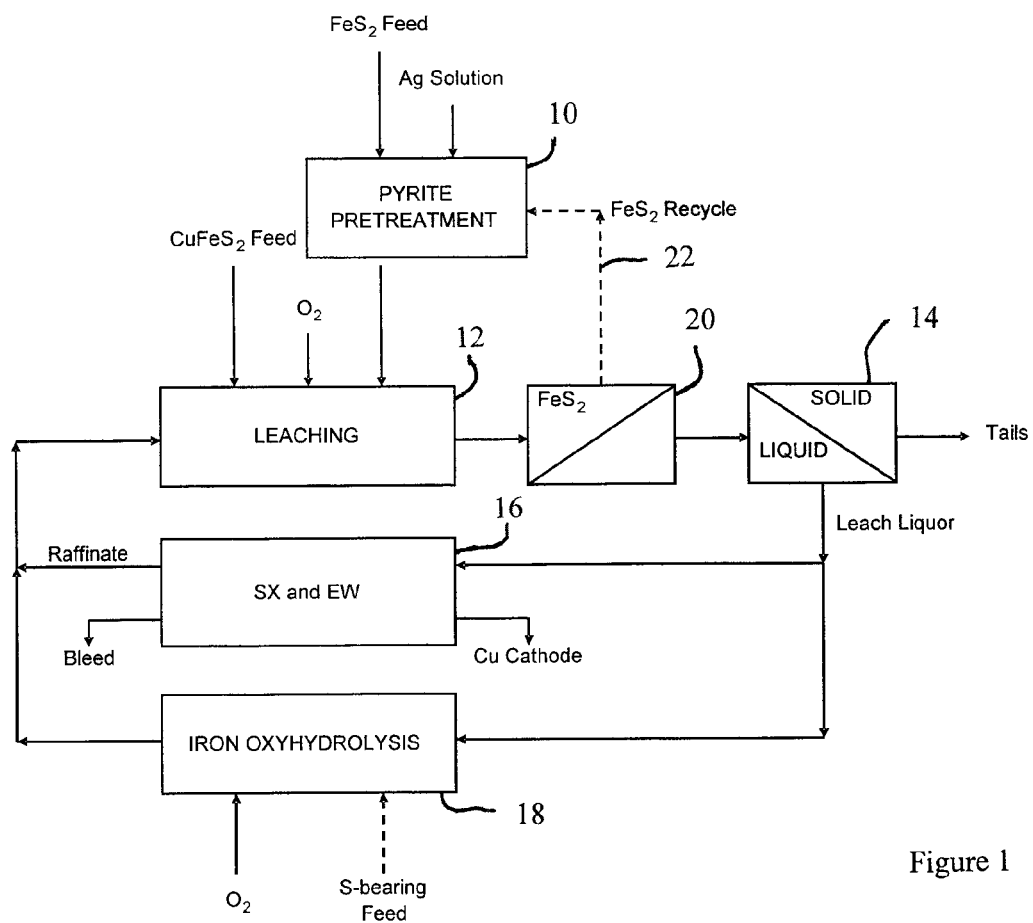
FIG. 1 is a flowsheet for the process of leaching copper from chalcopyrite according to one embodiment of the invention.

In one embodiment, as schematically illustrated in the process flowsheet of FIG. 1, the copper-recovery method of the invention comprises the basic steps of pyrite pre-treatment 10, copper leaching 12, separating and recycling the treated pyrite 20, 22, solid-liquid separation 14, solvent extraction and electrowinning 16, and oxyhydrolysis 18.

A. Pre-Treatment of Pyrite

Ground pyrite is pre-treated with silver ion (step 10) by soaking the finely-divided pyrite in a dilute solution of soluble silver salt, for example silver nitrate. The solution of silver salt with pyrite at a suitable pulp density, for example about 10%, is vigorously mixed. The finely divided pyrite adsorbs substantially all of the silver from the solution in a few minutes. The amount of adsorbed silver relative to the pyrite may be about 20 ppm or more, alternatively, about 50 ppm or more, alternatively about 100 ppm or more, or about 200 ppm or more. A relatively higher silver level increases the rate of copper extraction.

B. Leaching Reaction

The silver-treated pyrite and particulate chalcopyrite concentrate are added to an acidic sulfate leach solution. The treated pyrite and the chalcopyrite concentrate may be added separately or be mixed together before adding to the leach solution. The pyrite should be present in a catalytically-effective amount. For example, the weight ratio of the pyrite to the chalcopyrite present in the chalcopyrite concentrate may be about 1:1 or higher, alternatively 2:1 or higher, alternatively 4:1 or higher, or alternatively 6:1 or higher. A relatively higher ratio increases the rate of copper extraction. The leach solution is agitated vigorously to suspend the particles of chalcopyrite and pyrite, forming a leach slurry or suspension. The copper is leached from the chalcopyrite concentrate (step 12) in the presence of an oxygen-containing gas, for example air or oxygen, under conditions whereby the pyrite is substantially unoxidized.

In the method of the invention, pyrite is believed to act as a provider of an alternative surface for ferric reduction. Pyrite is most effective as a catalyst when it behaves strictly as a cathode. Hence, the leaching process is carried out under conditions in which the pyrite is not oxidized to any substantial extent, i.e. not to an extent that is material to the effective functioning of the process, and preferably not at all. This can be done by maintaining the solution potential below a certain level. The maximum operating solution potential (i.e. the potential at which the process is carried out) is less than about 500 mV versus Ag/AgCl (all solution potentials stated herein are expressed in relation to the standard Ag/AgCl reference electrode). Preferably, the operating solution potential is in the range of about 420 mV to 470 mV, alternatively in the range of about 445 mV to 455 mV, alternatively about 450 mV. The optimal operating potential varies depending on the solution temperature, 450 mV being preferred at a temperature of about 80° C.

By inhibiting the oxidation of pyrite, the loss of adsorbed silver into the leach solution is minimized.

In order not to exceed a certain solution potential in a ferric leaching reactor, one must ensure that the supply of ferric does not exceed the demand. In the present system, this means that the overall leaching reaction:

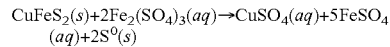

must be intrinsically faster than the ferrous oxidation reaction with dissolved oxygen gas:

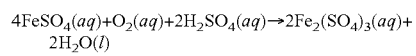

At low concentrations of ferric ion, the formation of argentojarosite is avoided. Furthermore, the silver remains largely with the pyrite. Hence, silver can be recycled back to the leach process simply by recycling the pyrite, as described below. About 10% of the silver is lost as silver sulfide, which reports to the residue.

Assuming that the proper set of operating variables has been identified in order to maximize the intrinsic leaching rate (i.e. pyrite:chalcopyrite ratio, particle size, acid level, and temperature), then it is a matter of engineering design to select appropriate levels of pulp density, oxygen flow rate, and agitation intensity such that the supply of ferric does not exceed the demand in any part of the leaching circuit.

The leaching process may be carried out as a continuous process, as illustrated in FIG. 1, and which is preferred, or on a batch basis. In batch mode, as the level of chalcopyrite in the leaching reactor (and, concurrently, the demand for oxidant) diminishes with time, it may be necessary to regulate the flow of oxygen to the reactor to prevent the solution potential from exceeding the desired maximum, particularly when pure oxygen gas rather than air is used. Alternatively, in a continuous process consisting of a number of leaching tanks in series, one would simply supply oxygen to each tank at the appropriate rate. This may be facilitated in practice by supplying pure oxygen or oxygen-enriched air to the first one or two tanks and air to the remaining tanks, or running the final tank without oxygen.

Also, in batch mode, it is desirable that the leach solution have an initial iron level of at least 1 gram per liter to initiate the leaching process. However, this is of no importance in a continuous process, where the breakdown of chalcopyrite will generate sufficient dissolved iron at steady state.

In the leach reactor chalcopyrite is leached selectively at low potential in the presence of the silver-treated pyrite catalyst, producing a solid sulfur residue, while ferrous is oxidized to ferric with dissolved oxygen gas:

Leaching:

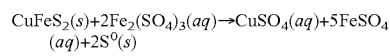

Ferrous Oxidation:

Overall:

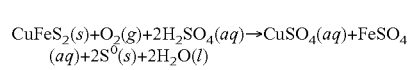

Because the solution potential is maintained low, the iron dissolved from chalcopyrite will remain mostly as ferrous. This reaction consumes two moles of acid per mole of copper.

The leaching process is run at temperatures between about 50° C. and the melting point of sulfur (about 110 to 120° C.). Alternatively, it can be run at a temperature of between about 70° C. and the melting point of sulfur. The leaching process can be run under any pressure between about atmospheric pressure and those pressures attainable in an autoclave. Preferably, it is run under about atmospheric pressure.

The leaching process is run under an atmosphere of oxygen-containing gas such as air, oxygen-enriched air, substantially pure oxygen, or any combination thereof, preferably in a series of leaching tanks.

The process works with a wide range of particle sizes of the pyrite and chalcopyrite. In this specification, the term P80 describes the particle size at which 80% of the mass of material will pass through the specified size of mesh. A P80 particle size for the pyrite may, for example, be in the range of 38 microns to 1000 microns. The P80 particle size for the chalcopyrite may be in the range of 38 microns to 210 microns. The pyrite particle size may be significantly larger than the chalcopyrite particle size.

The leach can be run at any pulp density that will seem reasonable to one skilled in the art. Higher pulp densities have several benefits. They facilitate the control of solution potential by ensuring high ferric demand and may also enhance the effectiveness of the galvanic couple between pyrite and chalcopyrite. They reduce the loss of adsorbed silver from the pyrite. Higher pulp densities also require smaller, more economical leach tanks.

According to the overall leach stoichiometry given above, at least two moles of sulfuric acid should theoretically be added to the leach for every mole of copper recovered from chalcopyrite. In practice, however, the acid requirement may fluctuate depending on the exact composition of the concentrate and the degrees of sulfur and ferrous oxidation and iron precipitation that occur during the leach. Preferably, at least 1.5 moles of sulfuric acid are added for every mole of copper recovered and more preferably at least 2 moles of sulfuric acid are added for every mole of copper.

C. Solid-Liquid Separation and Recycling of Pyrite

Following the leaching step 12, a solid-liquid separation step 20, for example elutriation or other dense media separation procedure, is performed to separate out the silver-treated pyrite, which is then recycled via a stream 22 to the leaching process. Fresh pyrite is separately treated with silver and this silver-treated pyrite is added to the recycled pyrite; alternatively, in the pretreatment tank some fresh pyrite and silver solution are mixed with the recycled pyrite. The liquid solution containing the copper ions and remaining solids, i.e. unleached chalcopyrite, if any, and sulfur residues, are subjected to a solid-liquid separation step 14. The solids are disposed of as tails.

D. Solvent Extraction and Electrowinning

The liquid solution produced in the solid-liquid separation step 14 is subjected to solvent extraction and electrowinning (step 16) to produce pure copper cathodes according to the following overall reaction.
SX-EW:

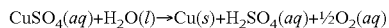

E. Oxyhydrolysis

In order to reject iron and to recover the remainder of the acid, a raffinate bleed stream is subjected to oxyhydrolysis 18 with oxygen gas to oxidize ferrous to ferric and form a stable ferric precipitate. One preferred method involves the formation of hematite thus:
Iron Oxyhydrolysis:

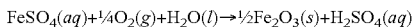

This process uses a small amount of oxygen gas, which can be supplied from a low-cost vapour pressure swing absorption (VPSA) plant. The hematite can simply pass through the leach circuit and be rejected to the tails; or alternatively a separate solid/liquid separation step may be used to separate hematite prior to recycling the acid from the autoclave. The steady state concentration of dissolved iron entering the leach circuit would be inversely related to the proportion of raffinate bled to oxyhydrolysis.

In principle, the overall chemistry of the process as envisaged does not require acid:
Overall Process:

$$CuFeS_2(s)+5/4O_2(g) \rightarrow Cu(s)+\tfrac{1}{2}O_2(g)+\tfrac{1}{2}Fe_2O_3(s)+2S^{\circ}(s)$$

(Note that the oxygen on the left must be supplied, while the oxygen on the right is lost to the atmosphere.) However, some make-up acid may be required to account for losses in tailings and bleed streams. This make-up acid can be produced during iron oxyhydrolysis by feeding a small portion of sulfur in the form of metal sulphides, including, but not limited to, chalcopyrite and pyrite, and/or elemental sulfur, or mixtures thereof, into the oxyhydrolysis reactor:
Chalcopyrite Oxidation:

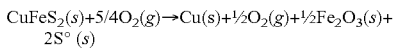

Pyrite Oxidation:

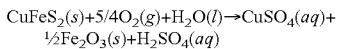

Sulfur Oxidation:

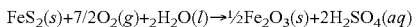

EXAMPLES

Copper leaching tests were performed to determine the effects of several variables on the kinetics of copper extraction from chalcopyrite. The tests were run using 1500 mL of acidic sulfate leach solution at a temperature of 80° C., oxygen gas, 1200 rpm agitation speed, pyrite P80 of 274 microns and chalcopyrite concentrate P80 of 46 microns. Sulfuric acid addition was 87 g/L for the high pulp density tests (FIGS. 11 to 13) and 20 g/L for all other tests. The acid concentrations were calculated to correspond to 150% of the stoichiometric requirement. The pyrite used contained about 20 ppm of naturally-occurring silver. Copper recovery was measured at various intervals. The tests and results are explained below in Examples 1 to 13.

Example 1

Figure 2:
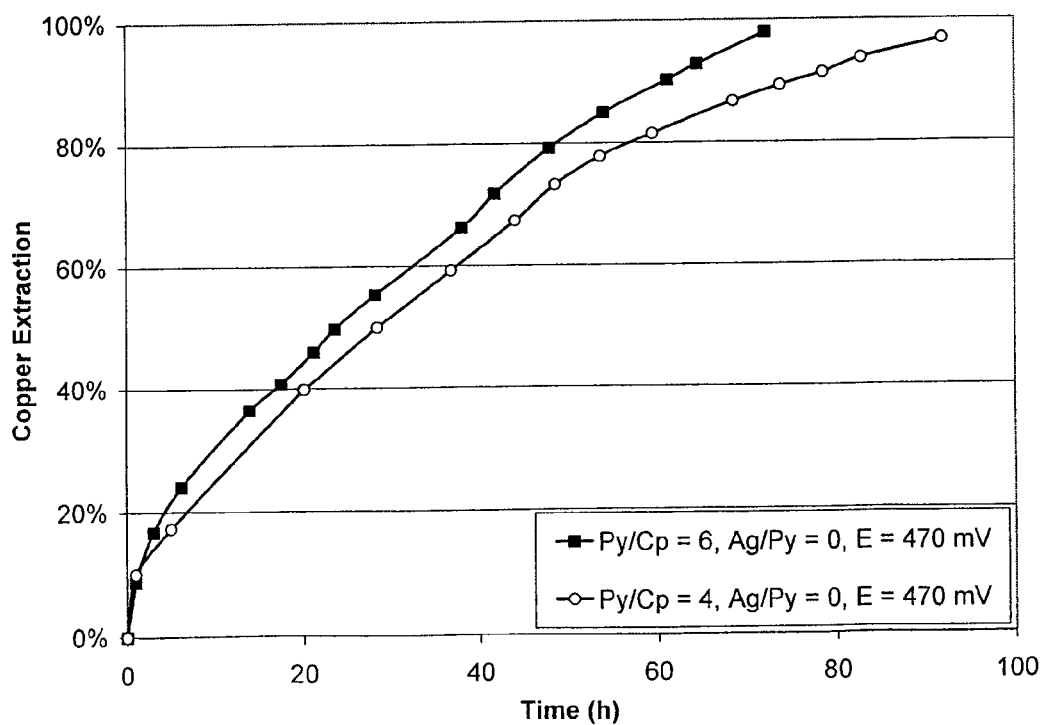
FIG. 2 is a graph of copper recovery versus leaching time using pyrite without silver pre-treatment.

The effect of pyrite addition at two different ratios, with no added silver, was determined. The weight ratios of pyrite to chalcopyrite were 4:1 and 6:1. The redox potential used was 470 mV. The results are in shown in FIG. 2. While the pyrite did facilitate the complete recovery of copper from the chalcopyrite, the required leach times were long (70 hours or more).

Example 2

Leaching was carried out using pyrite soaked in silver nitrate solution to make up 100 ppm of silver on the pyrite.

Figure 3:
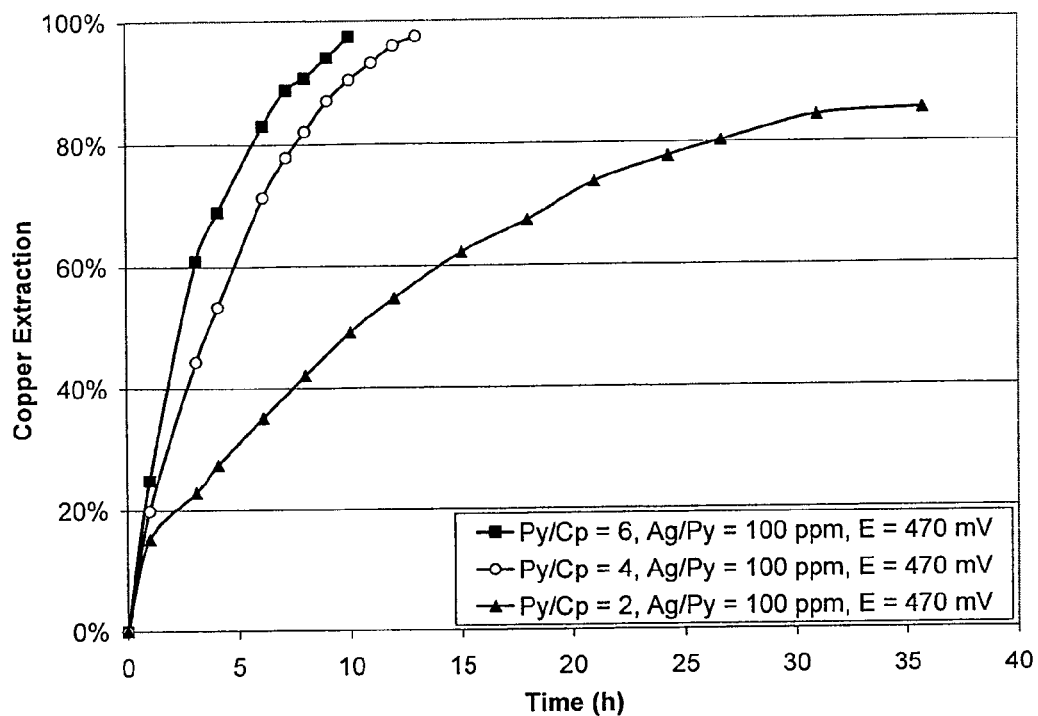
FIG. 3 is a graph of copper recovery versus leaching time using different pyrite to chalcopyrite ratios, with silver pre-treatment.

Pyrite to chalcopyrite weight ratios of 2:1, 4:1 and 6:1 were used. The redox potential was 470 mV. The results are shown in FIG. 3. At the highest pyrite to chalcopyrite ratio of 6:1, leaching was complete in about 10 hours.

Example 3

Figure 4:
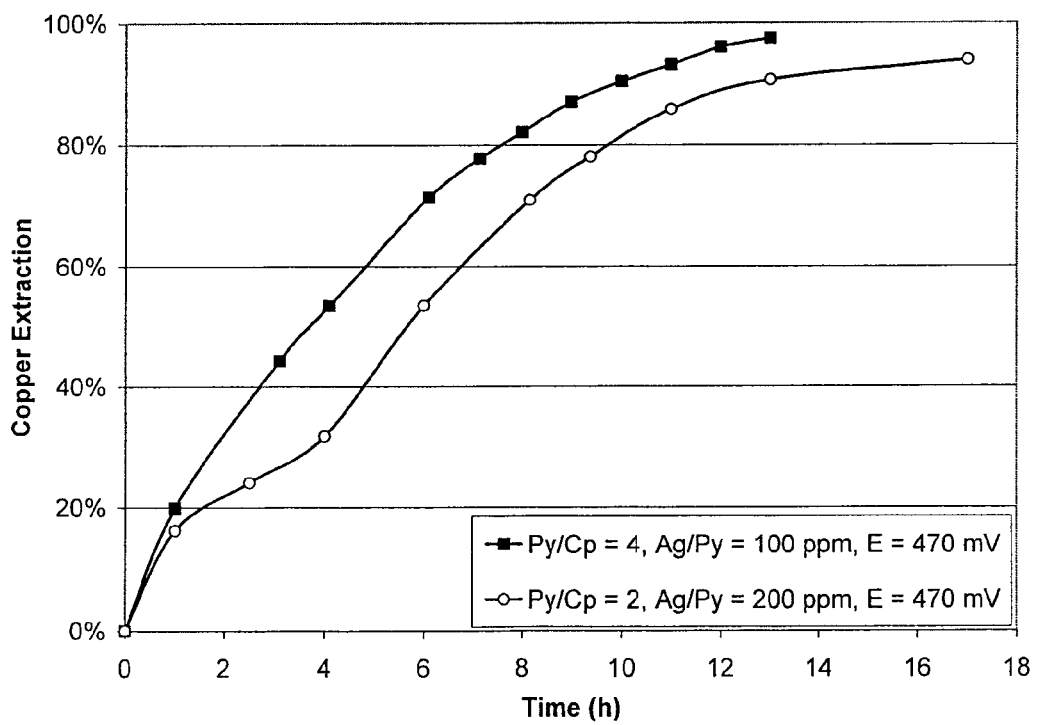
FIG. 4 is a graph of copper recovery versus leaching time using different pyrite to chalcopyrite ratios, with equal amounts of silver.

Leaching was carried out using pyrite to chalcopyrite weight ratios of 2:1 and 4:1. The pyrite in each sample had been pre-treated to contain 5 mg of silver (1.23 g silver per kg contained copper). The redox potential was 470 mV. The results are shown in FIG. 4. The leaching rate was faster at the higher pyrite to chalcopyrite ratio even though the total amount of silver in both cases was equal, confirming the beneficial effect of pyrite in the leaching process.

Example 4

Figure 5:
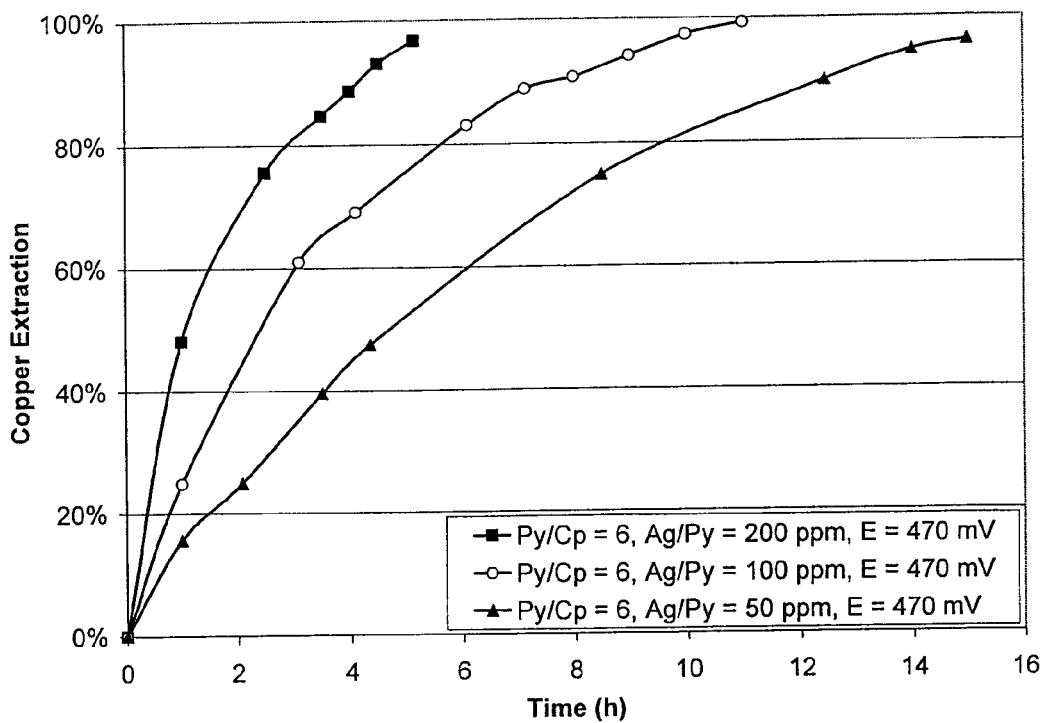
FIG. 5 is a graph of copper recovery versus leaching time using a constant pyrite to chalcopyrite ratio, with different concentrations of silver.

Leaching was carried out using a constant pyrite to chalcopyrite weight ratio of 6:1 and different silver to pyrite ratios, namely 50 ppm, 100 ppm and 200 ppm. The redox potential was 470 mV. The results are shown in FIG. 5. Increasing the concentration of silver increased the rate of copper extraction significantly. At a silver to pyrite ratio of 200 ppm, leaching was complete in about 5 hours.

Example 5

Figure 6:
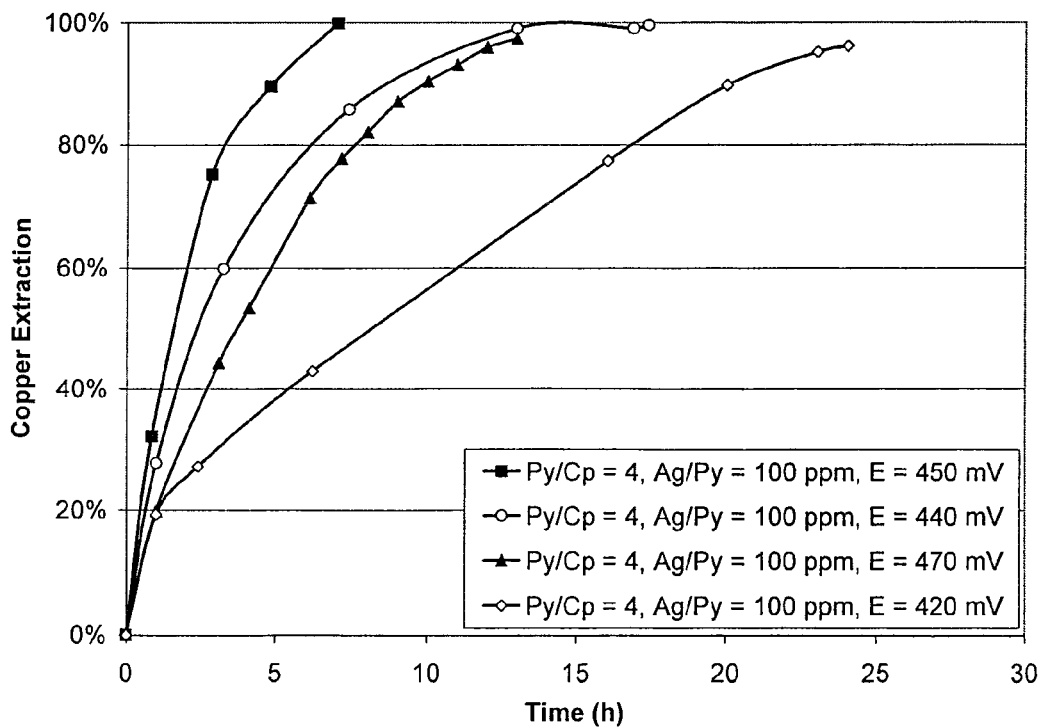
FIG. 6 is a graph of copper recovery versus leaching time using a constant pyrite to chalcopyrite ratio and a constant silver to pyrite ratio, at different redox potentials.

Leaching was carried out using different redox potentials on samples having a constant pyrite to chalcopyrite weight ratio of 4:1 and a constant silver to pyrite ratio of 100 ppm (1.23 g silver per kg contained copper). Redox potentials of 420, 440, 450 and 470 mV were used. The results are shown in FIG. 6. Redox potential was determined to have a major effect on the rate of copper extraction. The fastest rate was observed at 450 mV. The slower rate observed at 470 mV may be attributed to an increase in pyrite oxidation and subsequent loss of adsorbed silver to the solution. The rest potential of pyrite is about 455 mV. Hence, at 450 mV there should be little or no pyrite oxidation. However, as the results show, below 450 mV the rate of leaching decreased. This is likely the result of the lower driving force for the chalcopyrite leaching.

Example 6

Figure 7:
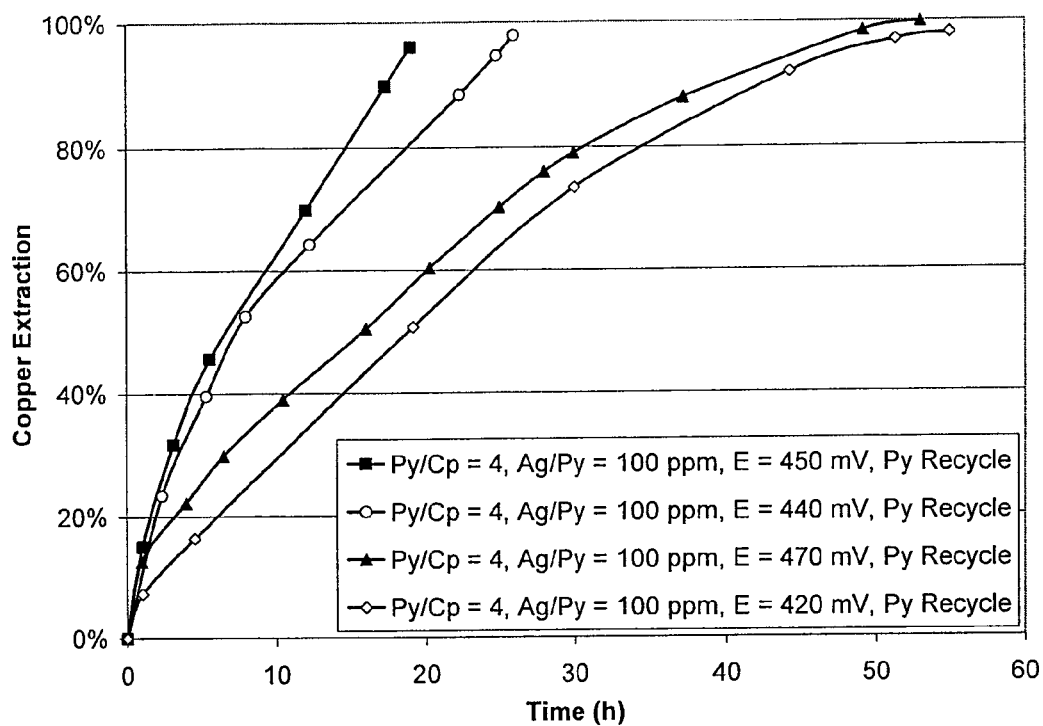
FIG. 7 is a graph showing the results of using pyrite recycled from the tests of FIG. 6 under the same conditions.

Leaching was carried out using pyrite recycled from the tests of Example 5 under the same conditions. The remains of the corresponding tests from Example 5 were allowed to settle, the supernatant leach solution was syphoned off and replaced with fresh solution, and a fresh sample of copper concentrate was added to the leach reactor. The recycled tests follow the same trend as the Example 5 tests using fresh pyrite, thus indicating that the silver-enhanced pyrite retains its catalytic properties. However, the leach times were all longer in the recycled tests by a factor of about 2. Solid assay results confirmed that the recycled pyrite contained less adsorbed silver than the freshly treated pyrite. The results are shown in FIG. 7.

Example 7

Figure 8:
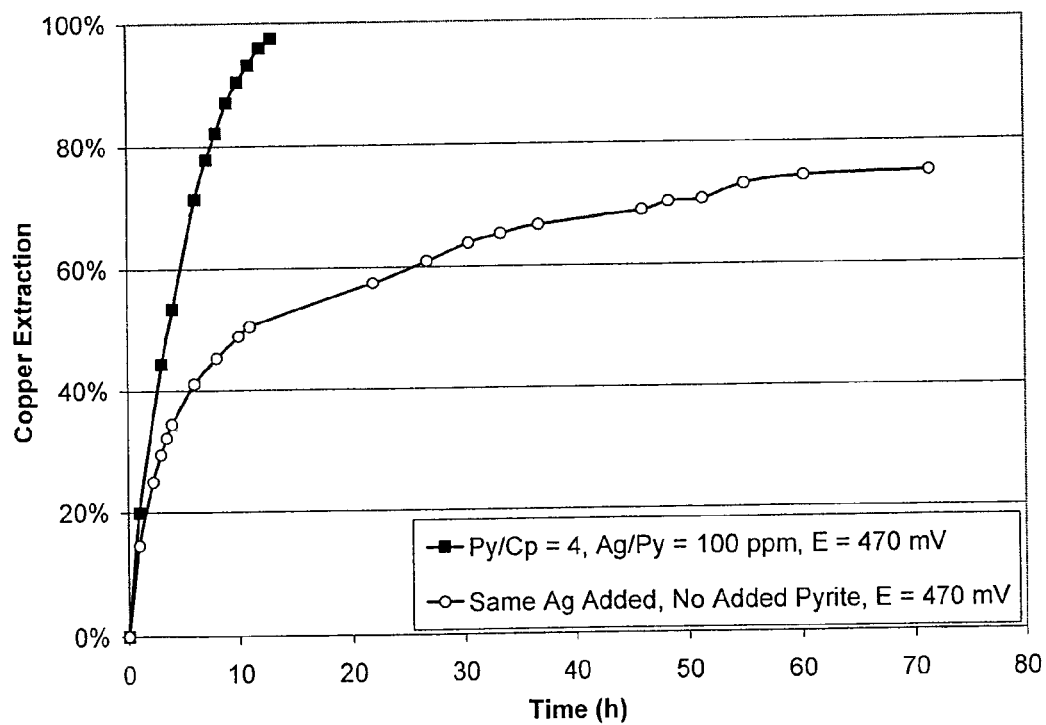
FIG. 8 is a graph comparing leaching using silver-treated pyrite to leaching using conventional silver-catalyzed leaching, at a redox potential of 470 mV.

Leaching was carried out to assess the effect of pyrite on the leaching process. One test used a sample with a pyrite to chalcopyrite ratio of 4:1 where the pyrite was pre-treated with silver (1.23 g silver per kg contained copper). In the other test, the same amount of silver was added directly to the chalcopyrite with no pyrite present. The redox potential used was 470 mV. The results are shown in FIG. 8. The presence of pyrite is seen to be a critical factor for achieving rapid and complete copper extraction. Although the initial rates of copper extraction for the two tests were similar, the rate declined sharply after just a few hours in the test without pyrite, and complete extraction was not attained even after 70 hours of leaching. However, in the presence of the silver-enhanced pyrite, leaching was very rapid for the duration of the test, and complete copper extraction was attained within about 12 hours.

Example 8

Figure 9:
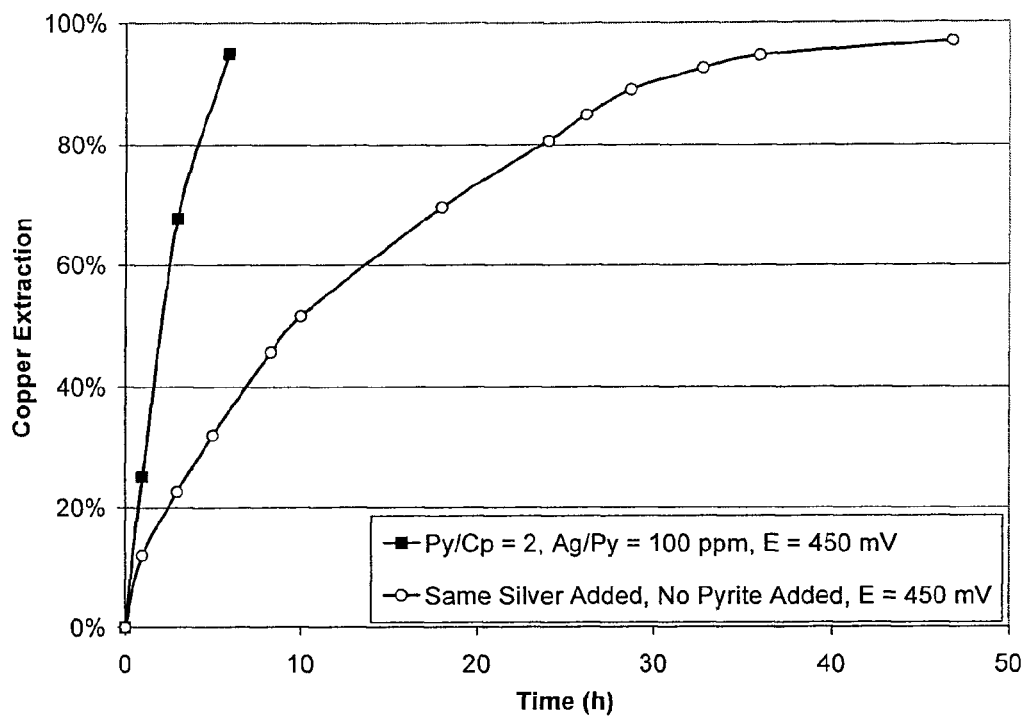
FIG. 9 is a graph showing the results of the same tests as in FIG. 8 repeated at 450 mV.

The tests of Example 7 were repeated at a redox potential of 450 mV and using half the amount of silver (0.65 g silver per kg contained copper). The results are shown in FIG. 9. They confirm the beneficial effect of lower solution potential, and also confirm the dramatic increase in both the rate and extent of copper extraction in the presence of pyrite. Even though the tests were conducted with only half the amount of silver of the previous tests, the results were significantly better, even in the absence of pyrite. This further confirms the benefit of operating a lower redox potential.

Example 9

Figure 10:
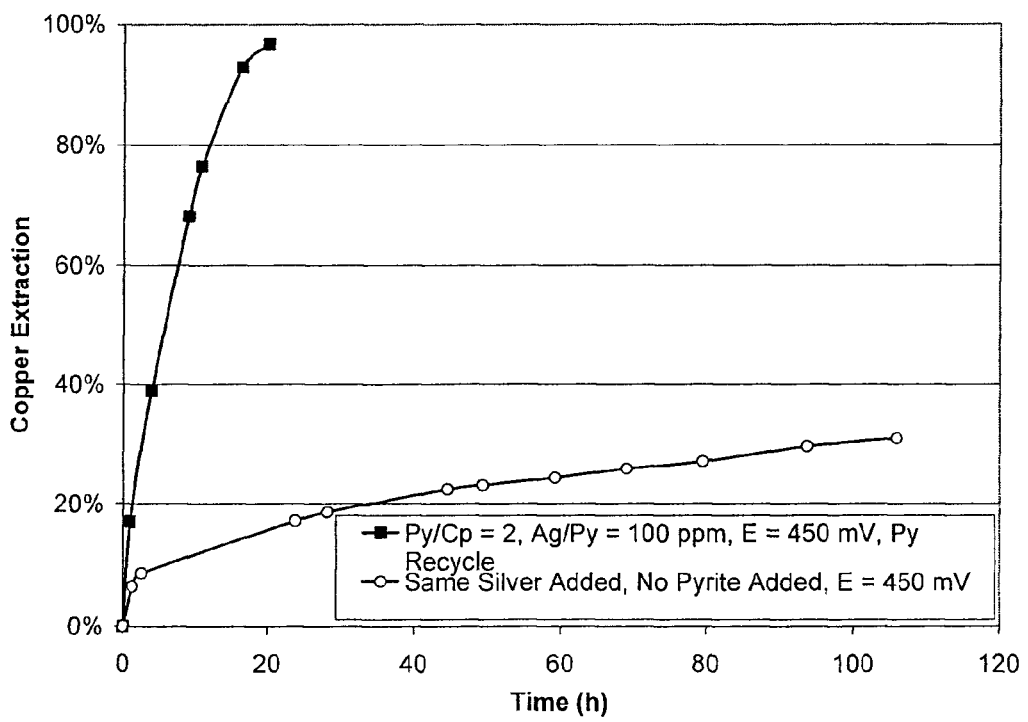
FIG. 10 is a graph showing the results of the tests of FIG. 9 repeated with recycled solid residues.

The tests of Example 8 were repeated using recycled solid residues to confirm that silver-enhanced pyrite retains its effectiveness as a catalyst upon recycling, and to determine whether the solid residues from the test in the absence of pyrite retained any similar catalytic ability. The results are shown in FIG. 10. Copper extraction in the presence of the recycled pyrite was rapid and complete within about 20 hours. However, the residue without pyrite retained little or no catalytic ability. Any silver remaining in this residue was probably in the form of tiny $Ag_2S$ particles embedded in elemental sulfur, as it is unlikely that argentojarosite would have formed to a significant extent at a redox potential of only 450 mV. Even so, the results indicate that silver used in conventional catalyzed leaching cannot be recycled directly, but must be recovered in soluble form, a complicated and expensive undertaking.

Example 10

While it has been demonstrated that recycled pyrite is an effective catalyst, it has also been noted that some of the adsorbed silver, and with it some of the catalytic effectiveness, is lost upon recycle. However, it was also determined that the concentration of silver dissolved in the leach solution at the end of each test was always about the same, and probably represented a solubility limit for silver under the prevailing conditions. Furthermore, this amount corresponded roughly to the amount lost from the recycled pyrite based on solid assay results. Hence, it was hypothesized that increasing the concentration of pyrite in the reactor would decrease the relative loss of adsorbed silver to solution.

Figure 11:
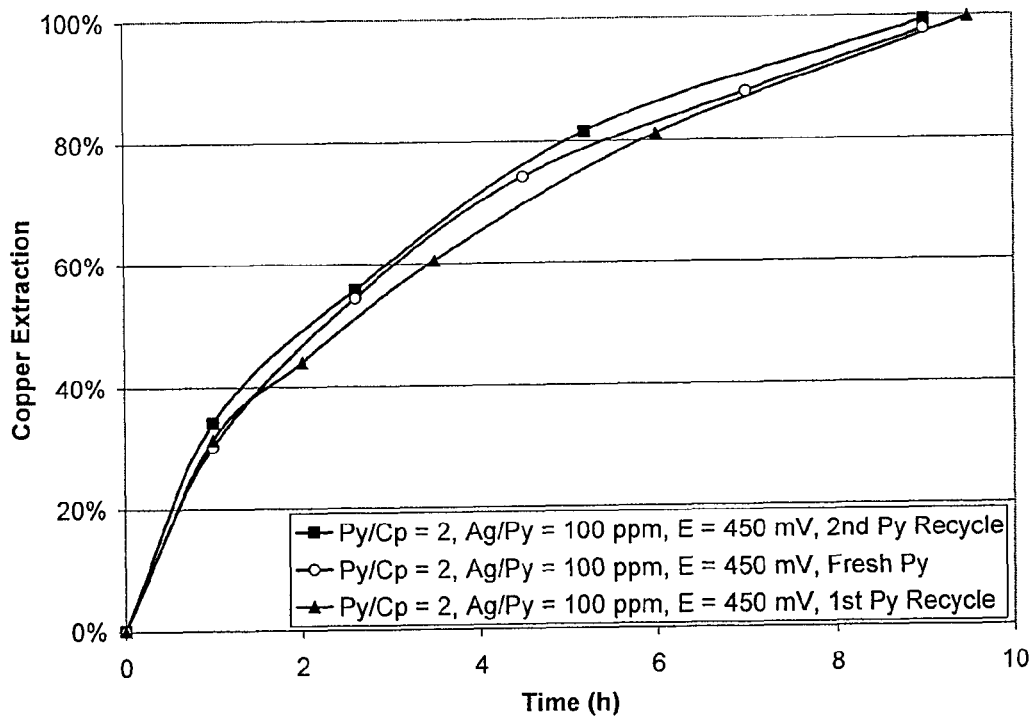
FIG. 11 is a graph of copper recovery versus leaching time using pyrite with silver-pretreatment, at a pulp density of 70 grams copper concentrate per liter of solution.

FIG. 11 shows the effect of increasing the pulp density on the rate of chalcopyrite leaching. Previous tests were run with 10 g of copper concentrate per liter of solution whereas FIG. 11 shows the results of three tests run with 70 g of copper concentrate per liter of solution, or 105 g total. In the first test, 175 g of fresh silver-enhanced pyrite with a silver-to-pyrite ratio of 100 ppm were added to give a pyrite-to-chalcopyrite ratio of 2:1. In the second and third tests, solid residues from the previous tests were recycled with fresh charges of copper concentrate, plus an additional 10% of the original charge, or 17.5 g, of fresh silver-enhanced pyrite. As shown in FIG. 11, leaching with recycled residue is just as fast as leaching with fresh pyrite, and there is no loss of catalytic ability even after recycling a second time. In fact, the second recycle test gave slightly faster leaching than the others, suggesting that the 10% makeup of silver-enhanced pyrite was more than adequate to ensure optimum catalytic effectiveness. In any case, the addition of 10% silver-enhanced pyrite to each recycle test corresponds to only 61 mg of silver per kg of contained copper.

Example 11

Figure 12:
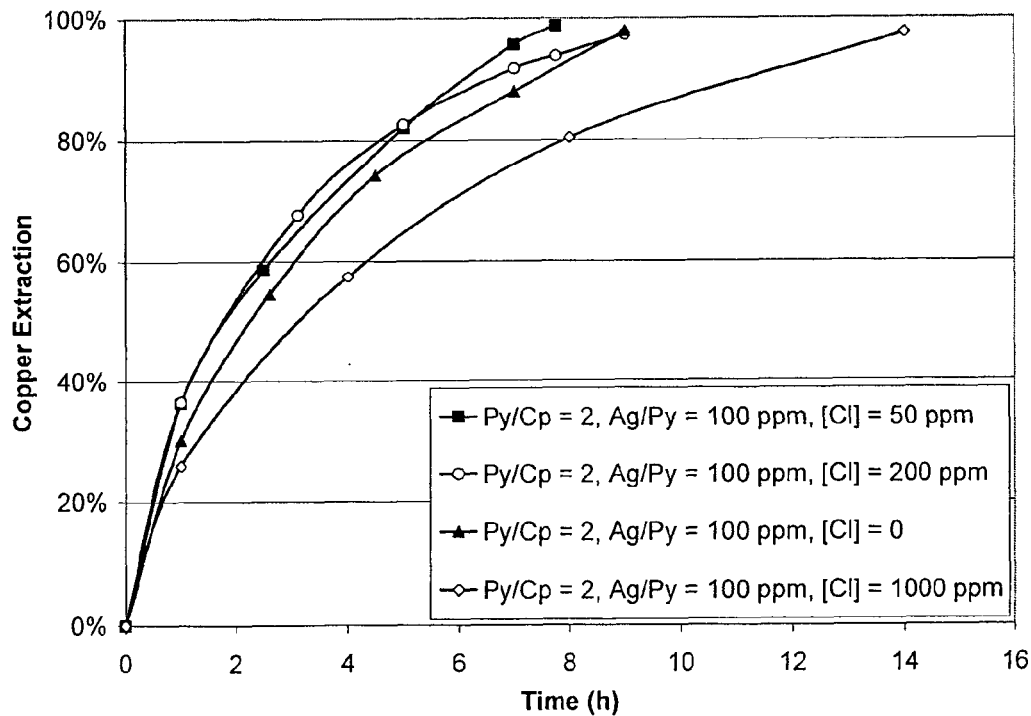
FIG. 12 is a graph showing the effect of chloride ion concentration in the leach solution.
Figure 13:
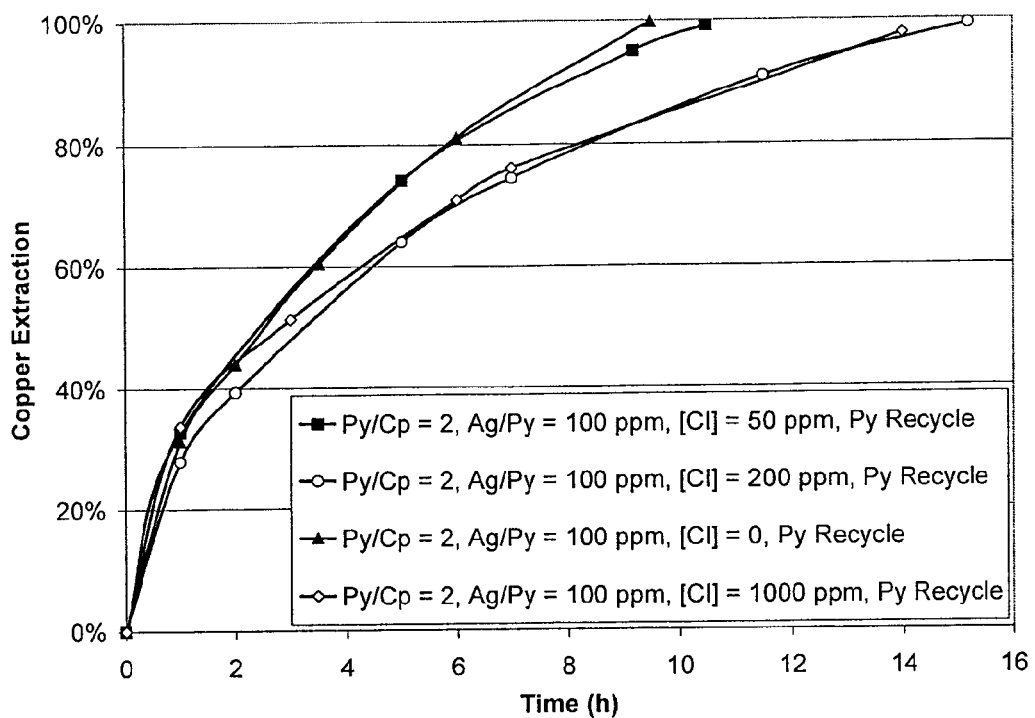
FIG. 13 is a graph showing the results of using pyrite recycled from the tests of FIG. 12 under the same conditions.

Tests were conducted to assess the effect of chloride concentration on the leaching process. It is known that dissolved chloride levels up to about 200 ppm are often found in hydrometallurgical process waters, and that chloride can precipitate silver as silver chloride, which has a very low solubility. Leaching tests were carried out using a pyrite to chalcopyrite ratio of 2:1, a silver to pyrite ratio of 100 ppm, and dissolved chloride concentrations of 0, 50, 200 and 1000 ppm. The redox potential was 450 mV. The results are shown in FIG. 12. Dissolved chloride up to 200 ppm was shown to have little or no detrimental effect on the rate of chalcopyrite leaching, and may even accelerate the rate slightly. The tests were repeated using pyrite recycled from the tests of FIG. 12. The results are shown in FIG. 13.

Example 12

Figure 14:
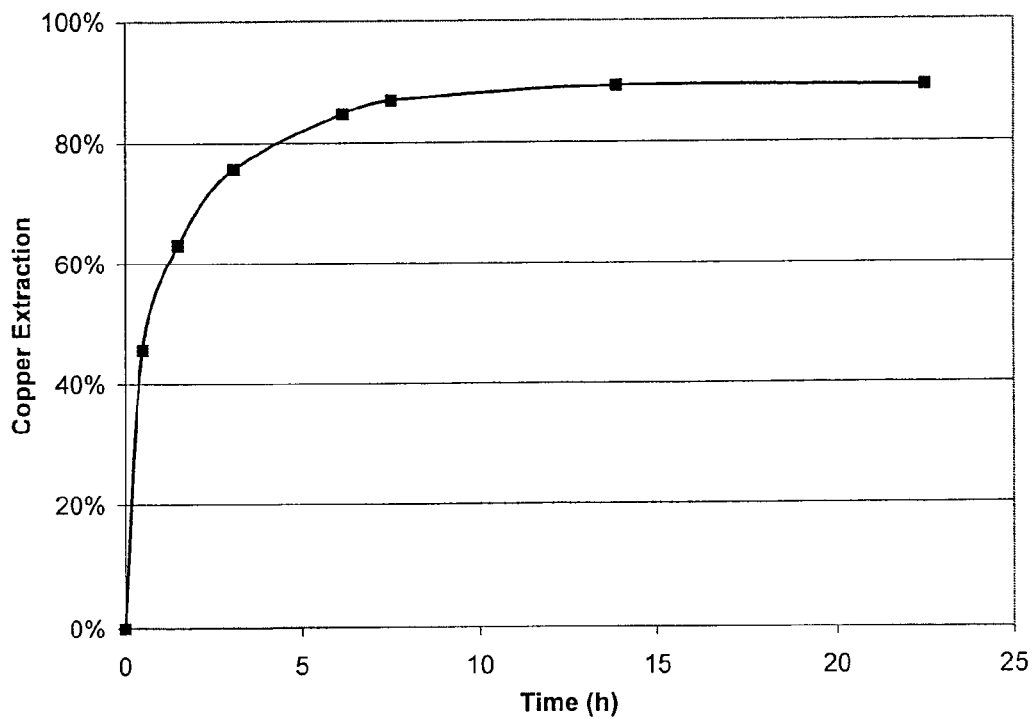
FIG. 14 is a graph of copper recovery versus leaching time using a prior art silver-catalyzed leaching process.

Tests were conducted to compare the leaching process of the invention with the "BRISA" process, a process based on conventional silver-catalyzed leaching as described in Carranza et al. (1997), Romero et al. (1998), and Romero et al. (2003), supra. The first test was run under conditions the same as those recommended for the BRISA process, namely temperature of 70° C., pulp density 2% (wt/v), 22.22 g silver per kg contained copper, and a redox potential of 600 mV. The amount of silver used in the BRISA process is nearly 40 times higher than the amount of silver used to enhance pyrite in the present invention. The results are shown in FIG. 14 and agree closely with the results reported in Romero et al. (2003). Leaching kinetics are reasonably rapid, but complete copper extraction is not attained.

Figure 15:
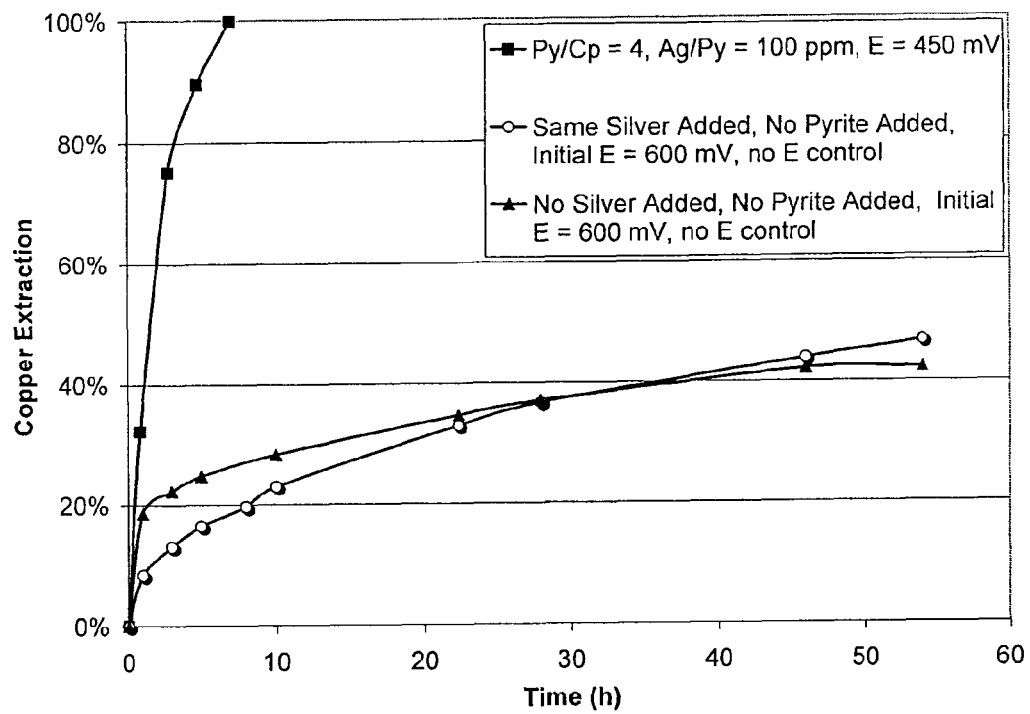
FIG. 15 is a graph of copper recovery versus leaching time, comparing the process of the invention to a prior art silver-catalyzed leaching process.

FIG. 15 shows the results of tests from the BRISA process and the present invention using silver-enhanced pyrite, both using the same amount of silver. For comparison purposes, another test was also run under identical conditions as the BRISA process, but without added silver. At the very low levels of silver addition used in the present invention, the BRISA process gives very similar results to leaching of chalcopyrite with no catalyst present at all. The main difference between these low-silver BRISA tests and the conventional silver-catalyzed tests shown in Examples 7 and 8 is that these BRISA tests were initiated at a much higher redox potential (about 600 mV) corresponding to the high ratios of ferric or ferrous recommended in Romero et al. (2003). This practice is antithetical to rapid oxidation of chalcopyrite.

Example 13

Figure 16:
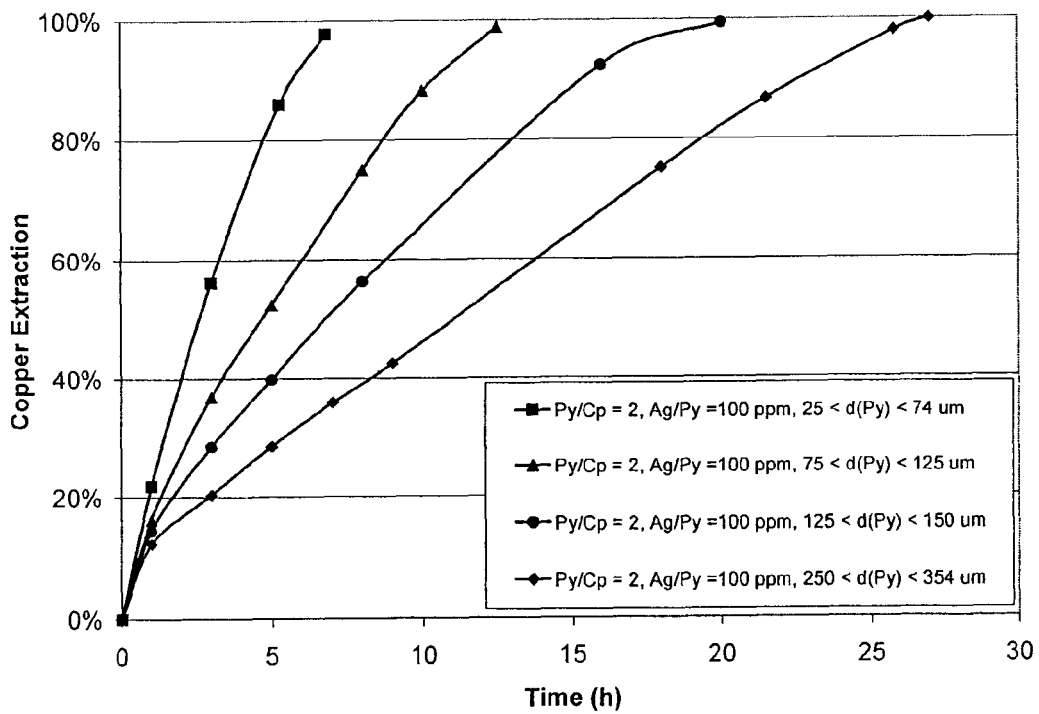
FIG. 16 is a graph of copper recovery versus leaching time using pyrite of different particle sizes.

Tests were conducted to assess the effect of silver enhanced pyrite on the rate of chalcopyrite leaching. Leaching tests were carried out using a constant pyrite to chalcopyrite weight ratio of 2:1 and a constant silver to pyrite ratio of 100 ppm. The results are shown in FIG. 16. The leaching rate was faster at the smaller pyrite particle size. In the test that pyrite was finely ground (25<d(Py)<74 µm), the leaching was complete in about 7 hours (6.8 hours). Using coarser pyrite particles, the leach times were longer.

Although the invention has been described in terms of various embodiments, it is not intended that the invention be limited to these embodiments. Various modifications within the scope of the invention will be apparent to those skilled in the art. The scope of the invention is defined by the claims that follow.

What is claimed is:

1. A method of recovering copper from chalcopyrite concentrate, comprising the steps of:
    (a) exposing particulate pyrite to silver ions to form a silver-treated pyrite;
    (b) mixing the chalcopyrite concentrate in particulate form with the silver-treated pyrite in an acidic sulfate leach solution;
    (c) leaching the copper from the chalcopyrite concentrate in the leach solution, in the presence of an oxygen-containing gas, under conditions whereby the pyrite is substantially unoxidized, to produce a solution containing copper ions; and
    (d) recovering the leached copper from the solution.

2. A method according to claim 1, wherein step (a) comprises applying a solution of soluble silver salt to the pyrite, whereby the pyrite adsorbs the silver ions.

3. A method according to claim 2, wherein the applying is done by one of soaking the pyrite in the solution of soluble silver salt or spraying the solution of soluble silver salt on the pyrite.

4. A method according to claim 2, wherein the silver salt is silver nitrate.

5. A method according to claim 1, wherein the pyrite to chalcopyrite weight ratio of the pyrite being mixed with the chalcopyrite being added concentrate being added is 1:1 or higher.

6. A method according to claim 1, wherein the pyrite to chalcopyrite weight ratio of the pyrite being mixed with the chalcopyrite being added concentrate being added is 2:1 or higher.

7. A method according to claim 1, wherein the pyrite to chalcopyrite weight ratio of the pyrite being mixed with the chalcopyrite being added concentrate being added is 4:1 or higher.

8. A method according to claim 1, wherein the pyrite to chalcopyrite weight ratio of the pyrite being mixed with the chalcopyrite being added concentrate being added is 6:1 or higher.

9. A method according to claim 2, wherein the amount of adsorbed silver relative to the pyrite is at least 20 ppm.

10. A method according to claim 2, wherein the amount of adsorbed silver relative to the pyrite is at least 50 ppm.

11. A method according to claim 2, wherein the amount of adsorbed silver relative to the pyrite is at least 100 ppm.

12. A method according to claim 2, wherein the amount of adsorbed silver relative to the pyrite is at least 200 ppm.

13. A method according to claim 1, further comprising the step of recovering at least some of the silver-treated pyrite from the leach solution and recycling the silver-treated pyrite for use in the leaching step.

14. A method according to claim 1, wherein the step of leaching includes agitating the leach solution to suspend the pyrite and chalcopyrite particles.

15. A method according to claim 1, wherein the conditions comprise maintaining an operating potential of the leach solution such that pyrite is substantially unoxidized.

16. A method according to claim 15, wherein the operating potential is 500 mV or less versus Ag/AgCl.

17. A method according to claim 15, wherein the operating potential is in the range of 420 to 470 mV versus Ag/AgCl.

18. A method according to claim 15, wherein the operating potential is in the range of 445 to 455 mV versus Ag/AgCl.

19. A method according to claim 15, wherein the operating potential is about 450 mV versus Ag/AgCl.

20. A method according to claim 15, wherein the maintaining of the operating potential is carried out by means of selecting one or more of: (i) the weight ratio of the pyrite to the concentrate; (ii) the particle size of the pyrite and the concentrate; (iii) the concentration of the acid; (iv) the temperature of the leach solution; (v) the pulp density level; (vi) the oxygen flow rate; and (vii) the intensity of agitation of the leaching solution.

21. A method according to claim 1, wherein the leaching step is carried out at atmospheric pressure.

22. A method according to claim 1, wherein the leaching step is carried out at a pressure above atmospheric pressure.

23. A method according to claim 1, wherein the step of leaching comprises chemical leaching.

* * * * *